United States Patent [19]

Meyer et al.

[11] 4,365,001
[45] Dec. 21, 1982

[54] LAMINATES OF IMPROVED FIRE RESISTANCE

[75] Inventors: Nicolas Meyer, Bully les Mines; Michel Cousin, Loison sous Lens, both of France

[73] Assignee: Societe Chimique Des Charbonnages, Paris, France

[21] Appl. No.: 256,368

[22] Filed: Apr. 22, 1981

[30] Foreign Application Priority Data

Apr. 24, 1980 [FR] France .................. 80 09192

[51] Int. Cl.$^3$ .............. B32B 27/08; B32B 27/36; B32B 27/42; C09K 3/28

[52] U.S. Cl. .................. 428/480; 252/609; 252/432; 428/482; 428/483; 428/506; 428/515; 428/524; 428/689; 428/702; 428/920; 428/921

[58] Field of Search .............. 428/506, 458, 460, 688, 428/689, 920, 921, 480–483, 515, 524, 702; 252/2, 609, 432

[56] References Cited

U.S. PATENT DOCUMENTS

| | | | |
|---|---|---|---|
| 2,024,568 | 12/1935 | Engel | 260/7 |
| 2,413,777 | 1/1947 | Oakley et al. | 260/683.4 |
| 2,419,057 | 4/1947 | Clifford | 260/84 |
| 3,306,860 | 2/1967 | Rowell et al. | 252/432 |
| 3,347,916 | 10/1967 | Huber | 260/561 |
| 3,679,710 | 7/1972 | Forster | 260/346.3 |
| 3,843,526 | 10/1974 | Roth et al. | 428/921 |
| 4,043,950 | 8/1977 | Wilmsen et al. | 428/921 |
| 4,123,414 | 10/1978 | Milette | 528/140 |
| 4,184,969 | 1/1980 | Bhat | 428/921 |
| 4,254,294 | 3/1981 | Juguin et al. | 585/525 |
| 4,272,403 | 6/1981 | Meyer et al. | 252/428 |
| 4,283,462 | 8/1981 | Meyer et al. | 428/506 |
| 4,289,662 | 9/1981 | Blasius | 428/921 |

FOREIGN PATENT DOCUMENTS

| | | | |
|---|---|---|---|
| 1144192 | 3/1969 | United Kingdom | 428/921 |
| 1272566 | 5/1972 | United Kingdom | 428/921 |

*Primary Examiner*—Bruce H. Hess
*Attorney, Agent, or Firm*—Millen & White

[57] ABSTRACT

There are obtained laminates of improved fire resistance comprising a substrate of reinforced phenolic resin, directly coated on at least one side thereof with a surface layer of a furan resin, and bonded to the outer surface of the furan resin a "gel-coat" of an unsaturated polyester resin, wherein the furan resin contains boron in sufficient amounts to impart an improved fire resistance to the laminates as compared to the fire resistance of the outer surface gel-coat. The boron is introduced as boric anhydride by use of a substantially anhydrous boric anhydride hardener solution to harden the furan resin.

10 Claims, No Drawings

LAMINATES OF IMPROVED FIRE RESISTANCE

CROSS REFERENCE TO RELATED APPLICATIONS

Concurrently filed by the same inventors is an application entitled "FURAN RESINS OF IMPROVED FIRE RESISTANCE", U.S. Ser. No. 256,367, based on French Application No. 80/9194, filed Apr. 24, 1980, the contents being incorporated by reference herein.

BACKGROUND OF THE INVENTION

The present invention relates to laminates of reinforced phenolic resins coated with hardened furan resins, which in turn are coated with a final thermosetting unsaturated polyester resin surface layer to remove surface irregularities.

Laminates comprising several successive layers of phenolic resins impregnated reinforcing agents are known in the art (see, for example, "Encyclopedia of Polymer Science and Technology", Interscience publishers 1970, Volume 12, page 1, "Reinforced plastics" and Volume 8, page 121 "Laminates", and Modern Plastics Encyclopedia, 1975–76, Volume 52, pages 153–158).

The phenolic resin generally used is a resol obtained by condensation of an aldehyde and a phenol in a basic medium, usually by condensation of formaldehyde and phenol in the presence of caustic soda. The curing or hardening of the resultant phenolic resin, i.e., cross-linking in a three-dimensional system, is achieved by using an acid catalyst, for instance, hydrochloric acid, sulfuric acid, phosphoric acid, oxalic acid, benzenesulfonic acid, paratoluenesulfonic acid, phenol-sulfonic acid.

The reinforcing agent comprises fiber forms such as cellulosic fibers, glass fibers, non-woven materials made of large molecular weight polyesters or of polyvinyl chloride, or glass mats or woven material, for example, of aromatic polyamides, glass or asbestos.

The manufacture of reinforced laminates is achieved by any of several methods. According to one process, the reinforcing agent used in the form of a woven or non-woven material is impregnated with a resin; the impregnation is completed by using a roll mill or a press; then several impregnated layers of reinforcing agent are brought together. Laminates can be also obtained by winding of a filament impregnated with a resin. According to still another process, fibers are cast on a layer of resin previously poured on the surface of a mold, the pouring of the resin and casting of fibers being alternately performed until the desired thickness is obtained.

Though well known, and a work horse of the industry since the 1920's, laminates based on phenolic resins still have significant drawbacks. In particular, they contain surface irregularities such as little holes, pocks, and fibers at and near the surface thereof projecting out over the surface. To obtain a smooth surface, it has been proposed to coat the laminate articles with a coating such as paint manufactured with a polyurethane binder, but the surface of the obtained article is not always smooth. A smooth surface can only be obtained by applying a primer coating or filler, e.g., a polyurethane resin, which plugs the pores, polishing the plugged surface and then painting the polished surface.

It has been also proposed to manufacture these laminates by pouring a resin layer on the surface of a mold, the resin layer being usually called a "gel-coat". With a gel-coat comprising a thin layer of filled or unfilled phenolic resin, the resultant surface still exhibits irregularities such as small pits, and the imprint of the fibers also appears on the surface thereof. Whereas surface irregularities could theoretically be removed by using a thicker layer of phenolic resin, small cracks or crazing appears on the surface.

The same drawbacks are observed when using a gel-coat by an unsaturated polyester resin. Moreover, by using phenolic resins or unsaturated polyester resins, the resultant hardness of the surface becomes insufficient.

A noteworthy improvement in this connection is described, in particular, in French Patent Application No. 79/01888 filed on Jan. 25, 1979 and corresponding, allowed U.S. application Ser. No. 114,877, now U.S. Pat. No. 4,283,462 filed by Meyer et al on Jan. 24, 1980, entitled "Phenolic Laminates With Furan Resin Coating". In this application are described laminate articles comprising a substrate of reinforced phenolic resin having on at least one side a furan resin layer directly bonded to the reinforced phenolic resin. The resultant laminate coated with a furan resin has a black colored surface; however, if desired, it is possible to attach directly to the coating(s) of the furan resin another coating of different pigmentable thermosetting resins such as a polyester resin. Such a laminate is obtained by depositing on a mold a first layer of a polyester resin mixed with a hardening catalyst, a second layer of furan resin and then a phenolic resin with its reinforcing agent, furan resins and phenolic resins being hardened by using known acidic catalysts such as paratoluenesulfonic acid.

The laminates prepared according to the above-cited patent application, in particular, articles which have a polyester gel-coat have both a smooth surface and a surface having the desired color, but they have the disadvantage of having a poor fire resistance, owing principally to the flammability properties of the "gel-coat". For instance, laminates having a polyester "gel-coat", a furan resin layer and a phenolic resin layer, these two last resins being hardened with known acidic catalysts, are classified "M 3", meaning that they are "moderately inflammable". This "M 3" classification and other classifications are determined with an epiradiator according to the Standard described in the French "Journal Officiel" (Official Journal) of July 26, 1973 (Decree of June 4, 1973).

SUMMARY OF THE INVENTION

An object of this invention is to provide laminates of reinforced phenolic resins having on one or both sides a furan resin layer bonded to an unsaturated polyester resin layer, of improved fire resistance.

Upon further study of the specification and appended claims, further objects and advantage of this invention will become apparent to those skilled in the art.

To attain these objects, the hardened furan resin layer must contain boron.

DETAILED DISCUSSION

It has been unexpectedly discovered that boron contained in the furan resin greatly improves the fire resistance of the laminates. Specifically, a laminate classified totally M 1 (i.e., non-inflammable) can be obtained by this invention when using a known polyester gel-coat bonded directly with a boron-containing furan resin, even if the polyester gel-coat itself has only a fire resistance of M 3. The fire resistance is determined with an epiradiator according to the standard described in the decree of June 4, 1973 (Standard NF P92501). Tests have shown that the boron contained in the furan resin remained entirely in the furan resin. Without being able to explain the precise reason why the boron contained in furan resin yields a laminate having a greatly improved fire resistance, it appears that the boron is acting at a distance.

The extent of improvement in the fire resistance of the laminates depends both on the amount of boron contained in the furan resin and on the fire resistance properties of the polyester gel-coat. In any case, a sufficient amount of boron is added to the furan layer to improve the fire resistance of the laminate preferably to render it non-inflammable, "M 1".

For example, a laminate of improved fire resistance classified as M 2 by the epiradiator can be obtained by using a polyester gel-coat which is itself classified as M 3 by the epiradiator, by using only a small amount of boron in furan resin equal to 0.12 parts by weight per 100 parts of furan resin. Better yet, a laminate classified as M 1 by the epiradiator is obtained by using a polyester gel-coat which is itself classified as M 3 to the epiradiator, by using an amount of boron equal to 0.26 part by weight per 100 parts of furan resin.

Thus, it is preferred to use relatively large amounts of boron in the furan resin, the actual amounts of boron in any given case being adjusted according to the nature and the initial behavior to fire of the polyester gel-coat. In general, the range is about 0.1 to 0.6 g of boron per 100 g of furan resin. (The boron amount is expressed as elemental boron).

The laminates of the present invention are prepared preferably according to the process described in U.S. Patent 4,283,462, cited above and incorporated by reference herein. According to this process, a first layer of a polyester resin is deposited on a mold, this first layer being the "gel-coat", a second layer of furan resin is then deposited, this second layer being at least partly hardened, then a substrate layer is deposited by using a phenolic resin and a reinforcing agent. It is also possible to deposit the substrate layer on a furan resin which is quite hardened. The different layers of resins are deposited according to known techniques such as the cold technique or the hot technique by using a press or by using the injection technique or by using the winding technique.

Furan resins suitable for preparing laminate articles of the present invention are known resins obtained by polymerizing furfuryl alcohol. It is possible to add furfural as a solvent. Furan resins are black liquids having a viscosity ranging between 50 and 15,000 centipoises. According to an important characteristic of the present invention the hardening of furan resins is not achieved by using known catalysts such as, for example, organic sulfonic acids or inorganic acids but by using the process described in U.S. Ser. No. 256,367, whose disclosure is incorporated by reference herein. According to the referenced patent application, furan resins are hardened in the presence of a substantially if not completely anhydrous solution containing at least 5 percent by weight of boric anhydride, one or more organic solvents and at least one concentrated acid. The hardener solution is disclosed in U.S. Pat. No. 4,272,403. By achieving the hardening of furan resins with these catalysts containing boron, it is possible to obtain laminate articles having an improved fire resistance.

Before hardening, the furan resin may be further modified by the incorporation of various known adjuvants: mineral fillers, spreading agents such as silicone oils, thixotropic agents such as pyrogeneous silica, solvents, for example, acetone.

Suitable phenolic resins for use in the laminate articles according to the present invention are the known resols, in particular, resols obtained by condensing formaldehyde and phenol in the presence of sodium hydroxide. Hardening is obtained by adding an acidic catalyst such as hydrochloric acid, sulfuric acid, phosphoric acid, oxalic acid, benzenesulfonic acid, paratoluenesulfonic acid and phenolsulfonic acid. It is possible to add to the phenolic resin various conventional additives such as fillers, solvents, and plasticizers. By using a plasticizer, for instance, a polyalcohol such as dipropyleneglycol, it is possible to obtain laminates having improved bending strengths. Preferred reinforcing agents comprise glass fibers. Polyester resins suitable for the manufacture of the laminates of the present invention are known resins used in the coating technique and in the manufacture of laminates. These polyesters are generally the reaction products of diacids and of dialcohols, the diacid generally being isophthalic acid or orthophthalic acid. These polyester resins most often comprise isophthalic acid and contain always fumaric or maleic acid, if desired they may contain titanium dioxide. The dialcohols are generally neopentylglycol, dipropyleneglycol, ethylene-glycol, or di ethylene-glycol.

The thickness of each layer of the laminate articles according to the present invention is comprised between 200 and 300 microns.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A layer of unsaturated polyester resin having a thickness of 0.2 millimeters was deposited by brushing on a mold which had been preliminarily treated with a conventional mold release agent. The polyester resin was of the isophthalic acid type and contained trichloroethylphosphate and titanium dioxide. This resin was hardened by using conventional peroxides, and a cobalt salt was added as an accelerator. This polyester layer was classified as M 3 according to standard NF P 92501, so this material is "moderately-inflammable"; the fire resistance was determined by using an epiradiator.

A layer of furan resin of 0.2 millimeter of thickness was deposited by brushing on the layer of polyester resin which was hardened in part. The furan resin had the following composition:

| | |
|---|---|
| Condensate of furfuryl alcohol in acid medium (Resin Quaccor 1001 - Trademark by Quaker Oats firm) | 100 parts |
| Pyrogenous silica | 2 parts |
| Boric anhydride solution in parts by weight | 1.5 parts |

| | |
|---|---|
| trimethylborate | 100 parts |
| boric anhydride | 60 parts |
| paratoluenesulfonic acid | 60 parts |
| 100% sulfuric acid | 6 parts |

The furan resin layer was hardened at room temperature for 20 minutes. The surface was slightly sticky. On this furan resin layer was deposited a fiber-glass mat and a phenolic resin obtained by condensing formaldehyde with phenol in a molar ratio formol/phenol of 1.5; its viscosity was equal to 10 poises at 20° C. The phenolic resin was hardened by adding to 100 parts by weight of phenolic resin 10 parts of a 65% by weight aqueous solution of paratoluenesulfonic acid. The phenolic resin was deposited on a fiber-glass mat by using a roller. The ratio by weight fiber-glass mat/phenolic resin equalled ⅓. The laminate article was hardened at room temperature for 4 hours and was withdrawn from the mold. The obtained laminate article was classified as "M 2" on the polyester gel-coat side (according to NF P 92501 by using the epiradiator). This classification means that the laminate article is "Inflammable with difficulty". The boron content in the hardened furan resin was 0.19 percent by weight.

EXAMPLE 2: Comparative Example

EXAMPLE 1 was repeated but the furan resin was hardened by using a 65% by weight aqueous solution of paratoluenesulfonic acid. 3.5 parts by weight of this acidic solution was added with 100 parts by weight of furan resin. The resultant laminate article was classified "M 3", the same as the polyester resin layer itself.

EXAMPLE 3

EXAMPLE 1 was repeated by using for the hardening of the furan resin, in each test, a boron catalyst which contained different amounts of sulfuric acid. The catalyst was also used in various amounts.

The hardening of the phenolic resin was achieved by using the same catalyst as in EXAMPLE 1. The polyester gel-coat was the same polyester resin as in EXAMPLE 1. The following table gives: the composition of the boric anhydride catalyst used for the hardening of the furan resin; the percentage in parts by weight of the catalyst containing boron; the boron amount contained in the furan resin after hardening; and the fire resistance classification of the polyester gel-coat side of the resultant laminate, this classification being determined according to French Standard NF P 92501.

| N° Test | 1 | 2 | 3 | 4 |
|---|---|---|---|---|
| Boron-containing catalyst composition (parts by weight) | | | | |
| trimethylborate | 100 | 100 | 100 | 100 |
| B$_2$O$_3$ | 60 | 60 | 60 | 60 |
| paratoluenesulfonic acid | 60 | 60 | 60 | 60 |
| sulfuric acid | 0 | 6 | 10 | 12 |
| Percentage of catalyst expressed in parts by weight based on 100 parts by weight of furan resin | 3.5 | 2 | 1 | 1 |
| Amount of boron in hardened furan resin (expressed per 100 parts by weight per hardened furan resin) | 0.475 | 0.26 | 0.12 | 0.11 |
| Fire resistance classification of the polyester gel-coat side (determined with the epi-radiator) | M 1 | M 1 | M 2 | M 3 |

Test No. 3 shows that a small improvement in the fire resistance of the polyester gel-coat can be achieved when the boron content is equal to 0.12%. Test No. 2 shows that a classification equal to M 1 is obtained with a percentage of boron equal to 0.26% in the hardened furan resin.

EXAMPLE 4

EXAMPLE 1 was repeated by using a polyester resin which was of the ortho-isophthalic acid type, this polyester resin having by itself a fire resistance classification equal to M 4, meaning that it is classified as "easily inflammable". The furan resin (100 parts) was hardened with 3.5 parts by weight of the same catalyst as used in EXAMPLE 1. After depositing the phenolic resin and a fiber-glass mat, there was obtained a laminate having a classification of M 1. The hardened furan resin contained 0.475 percent by weight of boron.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a laminate having a reinforced phenolic resin substrate, a hardened furan resin layer bonded to at least one side of said substrate, and a moderately inflammable thermosetting unsaturated polyester resin layer bonded to the obverse side of said furan resin layer, the improvement wherein said hardened furan resin layer is hardened by using as the hardener a substantially anhydrous boric anhydride solution comprising at least 5% by weight of boric anhydride; whereby sufficient boron is introduced into said furan resin layer as boric anhydride to improve the fire resistance of the laminate without requiring the incorporation of boron into the polyester resin layer.

2. A laminate according to claim 1, being non-inflammable.

3. A laminate according to claim 1, wherein the content of boron in said furan layer is 0.1 to 0.6 g per 100 g of furan resin.

4. A laminate according to claim 1, wherein said substantially anhydrous boric anhydride hardener solution further comprises at least one organic solvent and at least one acid, said acid being concentrated sulfuric acid, a sulfonic acid or a mixture thereof.

5. A laminate according to claim 4, wherein the organic solvent is trimethyl borate.

6. A laminate according to claim 4, wherein said anhydrous boric anhydride hardener solution contains (1) at least 5% by weight of boric anhydride; (2) an organic solvent, said solvent being a monoalcohol, a polyalcohol, a trialkylborate, a dialkylacetal of formaldehyde or a mixture thereof; and (3) from 5 to 70% by weight, based on the weight of the solution, of sulfuric acid, a sulfonic acid or a mixture thereof.

7. A laminate according to claim 6, wherein the organic solvent is trimethyl borate.

8. A laminate according to claim 1, wherein said hardener solution comprises, in parts by weight, 100 parts trimethyl borate and 60 parts boric anhydride.

9. A laminate according to claim 8, wherein said hardener solution further comprises 60 parts paratoluenesulfonic acid and 0–10 parts 100% sulfuric acid.

10. A laminate according to claim 1, wherein sufficient boron is introduced into said furan resin layer to render the resultant laminate substantially noninflammable.

* * * * *